Dec. 1, 1931.  A. J. DOTTERWEICH  1,834,387
WATER SOFTENING APPARATUS
Filed Dec. 27, 1927  2 Sheets-Sheet 1

WITNESS
A B Wallace

INVENTOR
Andrew J. Dotterweich
by William B. Jaspert,
his Attorney

Dec. 1, 1931.  A. J. DOTTERWEICH  1,834,387
WATER SOFTENING APPARATUS
Filed Dec. 27, 1927  2 Sheets-Sheet 2

WITNESS

INVENTOR

Patented Dec. 1, 1931

1,834,387

UNITED STATES PATENT OFFICE

ANDREW J. DOTTERWEICH, OF PITTSBURGH, PENNSYLVANIA, ASSIGNOR TO AUTOMATIC WATER SOFTENER COMPANY, OF PITTSBURGH, PENNSYLVANIA, A CORPORATION OF DELAWARE

WATER SOFTENING APPARATUS

Application filed December 27, 1927. Serial No. 242,611.

This invention relates to improvements in water softening apparatus of the type employing a softening material such as zeolite and which embodies apparatus for regenerating the zeolite with a salt or brine solution.

It is among the objects of the invention to provide water softening apparatus comprising a softening tank and a brine tank with a suitable system of piping in which the pipe elements are mainly enclosed within the tank structures.

Another object of the invention is to provide water softening apparatus in which the brine tank is provided with a salt trap which is contained within the tank.

Another object of the invention is to generally improve the construction of the tanks and the arrangement of the inlets and outlets to expedite the erection of the apparatus at its point of use, and to facilitate its operation whereby the efficiency of the system as a whole is increased.

Still another object of the invention is to provide an improved type of water softening apparatus which shall be of simple and compact mechanical construction.

Figure 2:
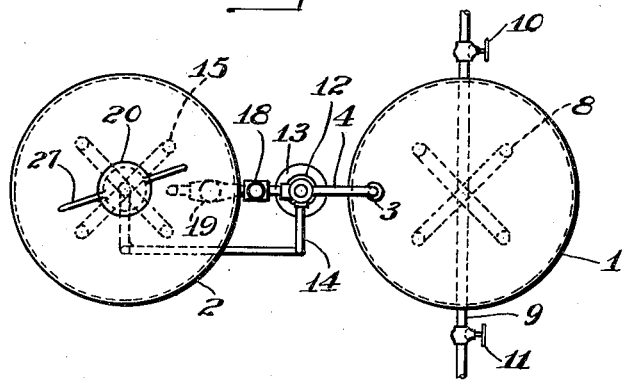
Figure 1:
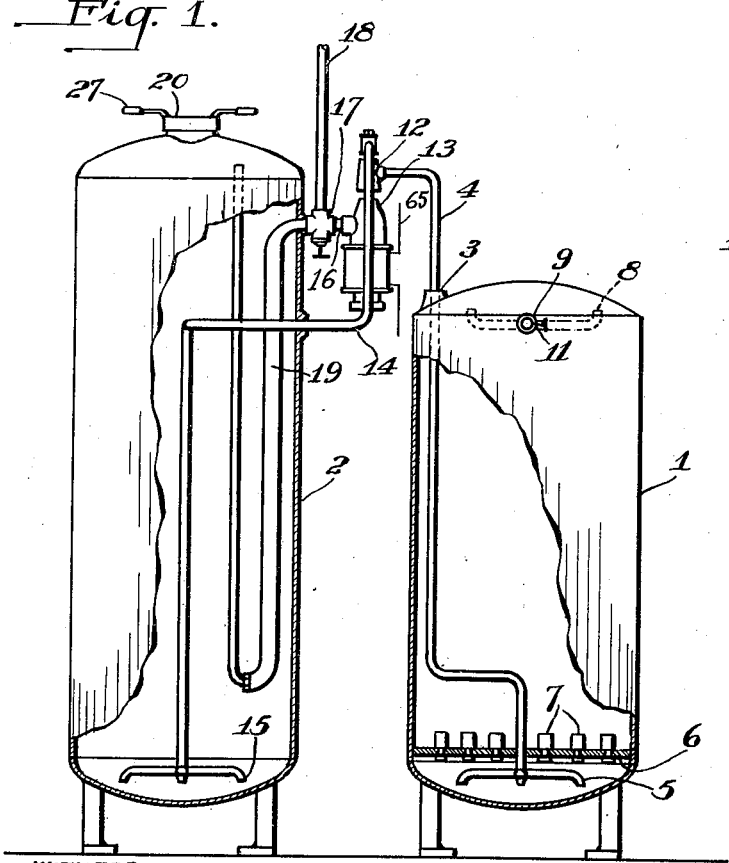
Figure 6:
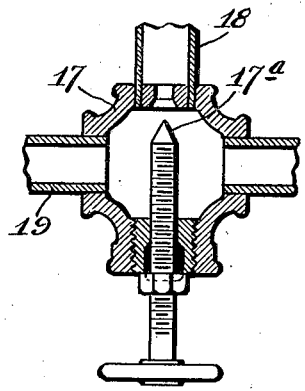
Figure 3:
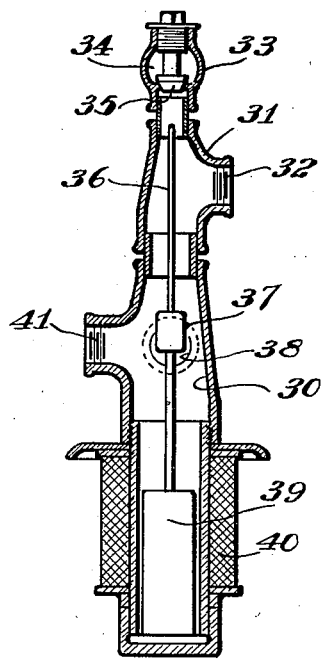
Figure 4:
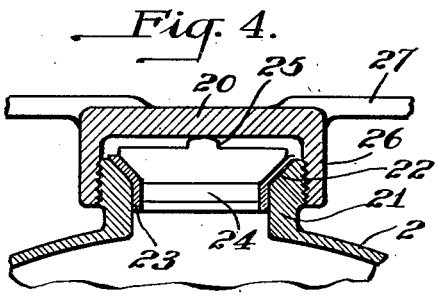
Figure 5:
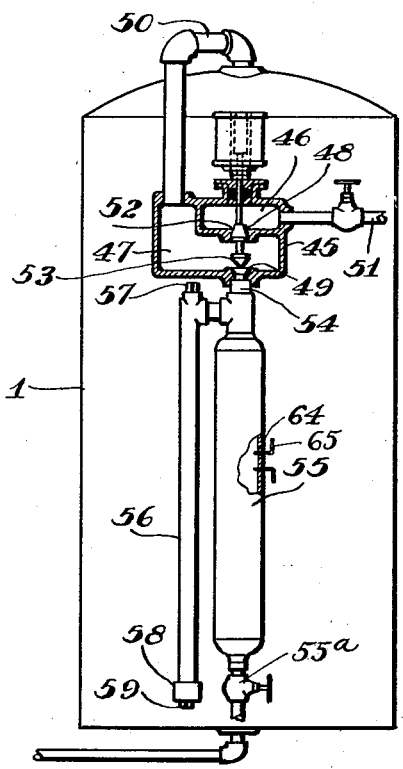

These and other objects will become more apparent from a consideration of the accompanying drawings in which like reference characters designate like parts and in which Fig. 1 is a front elevational view of a water softening apparatus illustrating a softening and a salt tank partially broken away; Fig. 2 a top plan view thereof; Fig. 3 a longitudinal sectional view of a valve mechanism therefor; Fig. 4 a cross sectional view of a special form of closure cap employed on the salt tank shown in Fig. 1; Fig. 5 is a front elevation of the softening tank with the valve box in section, and Fig. 6 is a view in cross-section of a valve for regulating the flow of water through the system.

Referring to Fig. 1 of the drawings, the structure therein illustrated comprises a tank 1 adapted to contain the zeolite or other softening material and a tank 2 for a salt solution which is conducted to the tank 1 at intervals to regenerate the softening material.

Tank 1 is provided with an inlet passage 3 adapted to receive a pipe line 4 which projects downwardly to the bottom of tank 1 and terminates into a plurality of outlet nozzles 5. Disposed above the outlet nozzles is a perforated partition member 6 having strainer nozzles 7 mounted thereon which are of the construction shown in my copending application Serial Number 242,612 filed Dec. 27, 1927, and which functions to equalize the flow of water or salt solution in the softening tank without clogging the strainer nozzle passages.

At the top of tank 1 a plurality of outlet nozzles 8 are joined to a pipe line 9 having valves 10 and 11 which respectively control the flow of fluid from tank 1 to a drain and a point of use. The inlet and outlet nozzles 5 and 8 are in angularly spaced relation as are the strainer nozzles 7 for the purpose of producing a uniform distribution or flow of water or salt solution through the zeolite bed as explained in the copending application referred to above.

The inlet pipe 4 leading to the tank 1 is connected at 12 to a valve mechanism 13 which is further connected by a pipe line 14 to a plurality of nozzles 15 at the bottom of tank 2. The valve 13 is connected at 16 to a cross 17 in which is disposed a valve 17a as shown in Fig. 6, and connected through a pipe line 18 to a source of raw water supply and also with a salt trap 19 that is contained in the tank 2.

The trap 19 functions to prevent the flow of brine or salt from tank 2 to the connection 17 during the normal softening period of the apparatus in the following manner: The raw water supply source 18 by its connection at 17 is in constant communication with trap 19 whereby tank 2 is under pressure of the supply line. During regeneration brine is drawn from tank 2 thereby reducing pressure in the tank which causes the brine or salt to accumulate in the trap 19. If the water supply to tank 2 were effected by direct connection with member 17 instead of through trap 19, the brine would get into the raw water supply to the softener when the apparatus is restored to softening condition after regeneration. By employing the trap, there can be no back flow from tank 2 through the supply line and when valve 13 is shut-off to terminate regeneration, the full pressure in the line 18 is again applied to tank 2 which forces the brine out of the large end of the trap 19 and prevents its escape to the softening tank 1 and the service line.

The tank 2 is provided with an opening at the top that is closed by a screw cap 20 which is of the construction shown in Fig. 4. The screw cap 20 engages an exteriorly threaded boss 21 and a chamfered seat 22 at the top of the tank. A gasket 23 of the shape of the seat 22 is disposed within member 21 and projects downwardly some distance below the edge of the seat. A plug 24 having a projection 25 on its upper portion and being generally of the shape of the gasket 23 is adapted to be placed on the gasket to compress the latter against the seat 22 when the cap 20 is screwed down. The cap 20 presses the plug 24 intimately against the gasket 23 to form a leak-proof joint. Handle members 27 are provided to produce sufficient leverage to seat and unseat the plug member 24 which by virtue of its construction requires very little pressure to seal the seat 22.

The enclosed piping leading to the inlet and outlet 5 and 15 of the tanks and the enclosed salt trap 19 are exteriorly connected to valve 13 in the following manner.

Referring to Fig. 3 of the drawings, the valve 13 comprises a valve casing 30 connected at its upper portion with a casing 31 having a passage 32 leading to the water softening tank 1. Casing 31 is further connected at is upper portion to a valve casing 33 having an outlet passage 34 leading to the salt tank through pipe line 14. A valve 35 is adapted to be displaced from its seat by a rod 36 which carries a choke or baffle 37 that is disposed in the passages 38 leading to the raw water supply 18. The rod 36 is actuated by a movable armature 39 of a solenoid 40 that is energized by a suitable source of electric energy and controlled in a manner to regulate the functions of regenerating and flushing the zeolite or softening material. The valve casing 30 is further provided with an outlet passage 41 leading to the salt trap 19 of tank 2. Thus, with the exception of the necessary connections for the piping and salt trap with valve 13 and control, practically all of the piping is disposed within the tanks which greatly improves the appearance of the apparatus, effects a saving of space in shipping, and reduces the labor necessary for assembling the apparatus.

In Fig. 5 the softening tank 1 is provided with a valve box 45 having chambers 46 and 47 with passages 48 and 49 respectively. Chamber 47 is connected to the outlet pipe 50 leading from the softening tank. Chamber 46 is connected to the service line 51 leading to the point of use. A solenoid actuated valve having valves 52 and 53 controls the passages 48 and 49 to direct the flow of water from the tank to the service line 51 or a drain 54 depending upon whether soft water or salt water is flowing from the tank. The drain is provided with a large pipe 55 controlled by a valve 55a and a small pipe 56. The small pipe 56 is open at the top and provided with an overflow nozzle 57. The bottom of pipe 56 is provided with a screw fitting 58 for receiving a plug 59 having a small opening for restricting the flow for a purpose hereinafter explained.

The pipes 55 and 56 constitute a divided drain path for the softener and the line 56 constitutes an overflow for the pipe 55 when valve 55a is regulated to permit 55 to fill up faster than it drains through valve 55a. A pair of electrodes 64 are disposed in the chamber of pipe 55 and are connected to the solenoid 40 through a power circuit to control operation of valve 13. When the brine solution drains from tank 1 through the drain pipes the pipe 55 will gradually fill up in the manner explained above until the brine contacts with electrodes 64 which grounds the solenoid circuit whereby valve 13 is closed shutting off the flow of brine.

The operation of the softening apparatus is briefly as follows:—The zeolite is placed in tank 1 directly on partition plate 6 and fills the greater portion of the tank. Salt is placed in tank 2 through the opening at the top and the system is connected to the raw water supply through the line 18. The valve 35 controlling the passage leading to the salt tank is normally closed during the softening operation which is during the time the water passing through the tank 1 is delivered to the service line or point of use.

When it is necessary to regenerate the zeolite or softening material, drain valve 10 is opened and valve 11 is closed. Raw water is then forced through the zeolite bed under pressure to loosen and expand the material. The solenoid 40 is then energized by suitable control mechanism to actuate its armature 39 which lifts rod 36 and unseats valve 35. By the upward movement of rod 36 choke 37 is placed in the restricted passage leading from the valve casing 30 to the casing 31 thus restricting the flow of water to the softening tank. The water from line 18 is thus conducted in part through trap 19 into the salt tank 2 and a salt solution is delivered through nozzles 15 at the lower end of tank 2 into pipe line 14 through passage 34 at the top of valve 13 and to the pipe line 4 leading to the softening tank 1.

When the softening material has been regenerated by the salt solution, the solenoid 40 is de-energized and the armature 39 drops by action of gravity thus permitting the valve 35 to seat, which shuts off the supply of brine.

Raw water is then conducted to the softening tank to flush out the brine from the zeolite bed and during this period as well as during the regenerating period the valve 11 or 52 leading to the point of use is closed and valve 10 or 53 leading to the drain is opened. After a sufficient supply of raw water has been passed through the zeolite to flush out the brine, valve 10 or 53 is closed and valve 11 or 52 opened and the apparatus is again in condition for use in softening water. The trap 19 is of such size that the passing of salt during the softening period will not be in excess of the capacity of the trap as the latter will only partially fill with salt at the bottom, and the salt so accumulated in the trap during the softening period is washed out during the subsequent regenerating period. Thus the trap is cleared of salt during succeeding periods of regeneration.

For the purpose of setting or regulating the flow of water through the system in accordance with the capacity of the zeolite bed, the valve 17a, Fig. 6, may be adjusted as follows:—

The plug 59, Fig. 5, is fitted in the drain line 56. Valve 52 is closed to shut off the flow to the point of use and the passage 49 is open to the drain. When water flowing through the tank runs out at the overflow 57 valve 17a is adjusted to restrict the flow to the point where water barely flows out of the overflow. This is the correct rate of flow for the tank and the plug 59 is then removed. It is of course obvious that the size of opening in plug 59 is determined by the rate of flow desired.

Although several embodiments of the invention have been herein set forth it will be obvious to those skilled in the art that various modifications may be made in the details of construction and in the arrangement of the several cooperating parts without departing from the principles herein set forth.

I claim herein as my invention:

1. Water softening apparatus comprising in combination a tank containing softening material, a tank containing regenerating material and inter-connecting piping therefore, and a trap of substantially U-shape disposed in said last named tank having one end opening in said tank and having the other end projecting at the outside of said tank.

2. Water softening apparatus comprising in combination a tank containing softening material, a tank containing regenerating material and inter-connecting piping therefor, a trap of substantially U-shape disposed in said last named tank having one end opening in said tank and having its other end projecting at the outside of said tank, and means for preventing the escape of the regenerating material through said trap.

3. A water softening apparatus having, in combination, a softening tank, a closed brine tank, a water supply pipe connected with both tanks, there being a water passage through which water normally flows from said pipe to the softening tank, a brine delivery pipe connecting the brine tank with said water passage between the softening tank and the connection of said passage with the water supply pipe and brine tank, said brine pipe having a normally closed valve, and means for choking or partially restricting said water passage between its connection with said brine passage and its connections with the water supply pipe and brine tank and for opening the said valve.

In testimony whereof, I have hereunto set my hand.

ANDREW J. DOTTERWEICH.